July 9, 1929.  W. B. BRADY  1,719,963
COMPOSITE ELECTRICAL BRUSH OR CONTACT AND METHOD OF PRODUCING SAME
Filed March 29, 1926
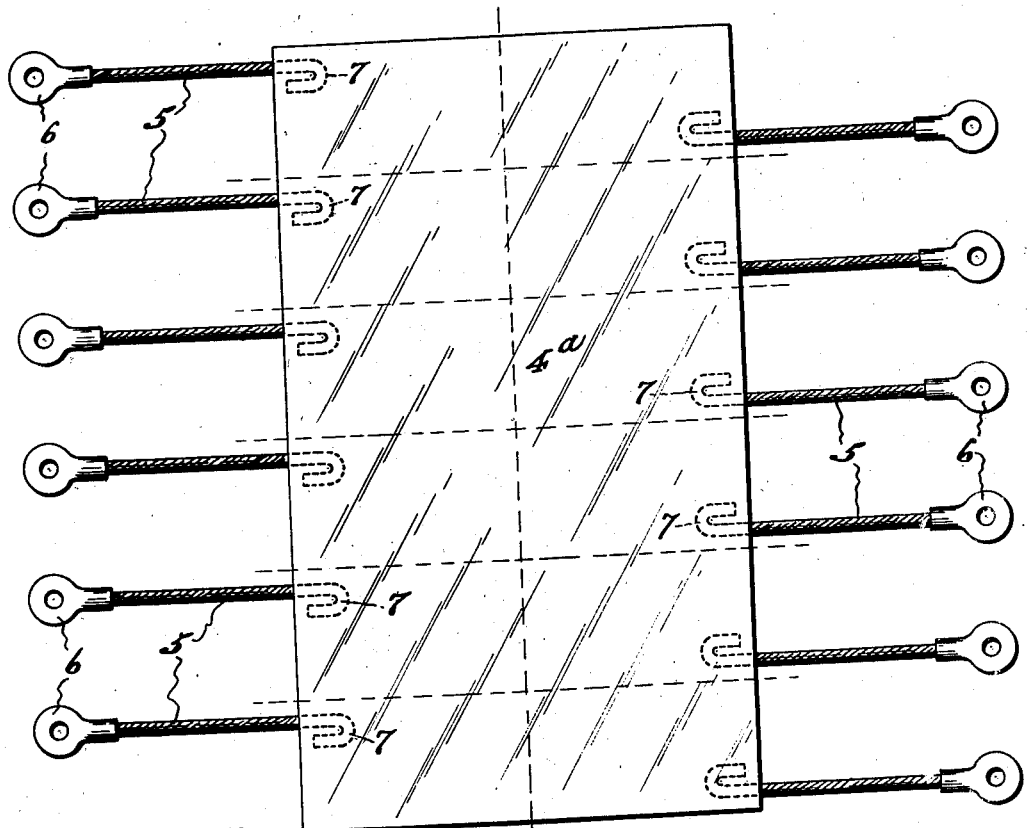
Fig. 5
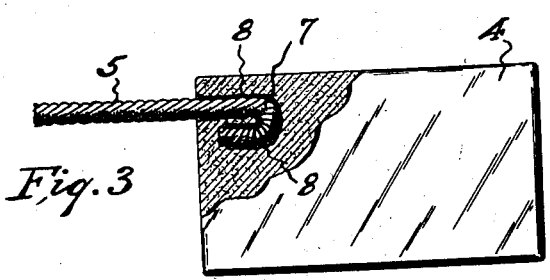
Fig. 3
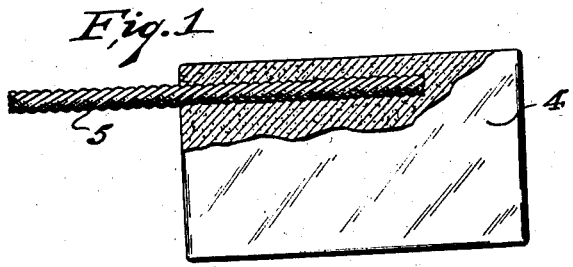
Fig. 1
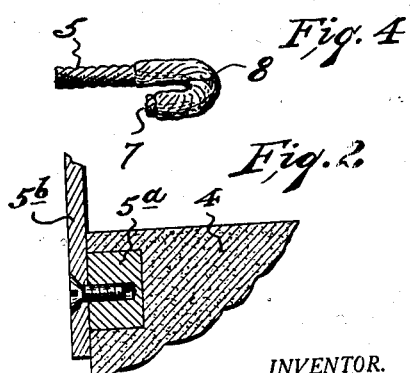
Fig. 4
Fig. 2
INVENTOR.
W. Burke Brady,
BY
Fraentzel and Richards
ATTORNEYS.

Patented July 9, 1929.

1,719,963

UNITED STATES PATENT OFFICE.

WILLIAM BURKE BRADY, OF NEW YORK, N. Y., ASSIGNOR TO ALBERT C. HENRY, OF INWOOD, LONG ISLAND, NEW YORK.

COMPOSITE ELECTRICAL BRUSH OR CONTACT AND METHOD OF PRODUCING SAME.

Application filed March 29, 1926. Serial No. 98,114.

This invention relates to improvements in composite electrical brushes or contacts bearing a metallic connection for conducting current to or from the same, and to a method of manufacturing such composite brushes or contacts by a molding process.

Electrical brushes or contacts of the composite type are made from various forms of electrically conductive material, such as graphite, carbon, metallic powder, or combinations thereof, in combination with a suitable binder, these materials being mixed and then molded into suitable form.

In the use of such composite electrical brushes or contacts in connection with various forms of electrical devices and machines, the same are usually provided with a lead or metallic current carrying connection, which may be of either rigid or flexible form, accordingly as the one form or the other may be best suited to a particular condition of use. Heretofore it has usually been the practice to attach such current carrying leads or connections to the body of the composite brush or contact, after the latter is formed or shaped, by means of a bolt, rivet, wedge, or by an adhesive, such as cement. Such mechanical methods of attachment, involving forms of fastening devices or adhesives, are open to objection for the reason that the current carrying leads or connections thus secured, when in use, are likely to be subjected to vibration tending to loosen the same; furthermore, loosening of the lead or connection may result from the differences in the coefficients of expansion between the brush or contact body and the lead or connection and fastening means, such loosening tending to interrupt good electrical contact between the parts, and thereby objectionably increasing the resistance between the brush or contact body and the current carrying lead or connection.

It is the principal object of this invention to provide, in connection with a composite electrical brush or contact, a metallic lead or connection adapted to conduct the current to or from the brush or contact body, as the case may be, which is securely affixed to said body in efficient electrical and mechanical connection by imbedding its attached portion in the same during the process of molding it, whereby the material of the brush or contact body is compressed and hardened about said attached portion of the current carrying lead or connection, thus producing both a strong mechanical coupling of the members as well as an intimate electrical union or mutual contact thereof, adapted to resist tendency to loosen under vibration or expansion and contraction.

The invention also embraces, in a more specific aspect thereof, the treatment of the attached end or portion of the metallic lead or connection by coating the same with another relatively soft metal to produce a more intimate electrical relation between the composite body and the metallic lead or connection, particularly in cases where the area of contact between said members is comparatively small.

The invention has for a further object to provide a novel method of producing composite electrical brushes or contacts with an imbedded or molded in current carrying metallic lead or connection.

The invention is illustrated in the accompanying drawings, in which:—

Figure 1 is in part a side face view and in part a sectional view showing one embodiment of my present invention; Figure 2 is a fragmentary sectional view showing another embodiment of my invention.

Figure 3 is in part a side face view and in part a sectional view showing another embodiment of my invention, in which form the attached end of the metallic lead or connection is treated with a coating of relatively soft metal prior to molding the same into the brush or contact body.

Figure 4 is a fragmentary side elevation of the attached end of the metallic lead or connection coated with the relatively soft metal.

Figure 5 is a plan view illustrating a method of molding the composite brush or contact material in plate form with a plurality of metallic leads or connections embedded therein during the molding process, and so disposed or distributed as to be respectively connected with a single brush or contact units into which said plate may be finally divided, this being one convenient method of manufacture.

In practice, my invention is concerned with a composite brush or contact made of a conductive material such as graphite, carbon or metallic powder, or suitable combinations thereof, using a binder that will be hardened by a heat at temperatures below the melting point of the metallic lead or connection to be imbedded and thus coupled with the resultant brush or contact body. This invention is particularly applicable to brush or contact bodies formed from mixtures of conductive material and binder such as disclosed in United States Letters Patent No. 1,556,990 issued to Ralph L. Henry, under date of October 13th, 1925, wherein binders, such as a condensation product resulting from the reaction of formaldehyde upon phenol or a phenolic body, or other resinous gum, or any other form of condensation or other product which possesses the property of becoming insoluble and infusible when subjected to the action of heat at relatively low temperature, e. g. not in excess of 500 degrees C. are employed.

Usually the metallic lead or connection, with which it is desired to provide composite brushes or contacts, especially when the latter are employed as commutator or similar brushes, consists of a flexible copper wire 5, although other metals of relatively high melting point and good electrical conductivity may be employed. The flexible connection 5 may be provided at its outer free end with a perforate metallic contact piece 6, if desired.

The composition of conductive material and binder of the general character above mentioned is mixed up in proper proportions, preferably in the manner and proportions described in the aforesaid Henry patent, and a suitable mold is prepared in which the composition may be shaped to provide a resultant brush or contact body or mass 4 of desired dimensions. Suitable means are provided for supporting the metallic leads or connections 5, whereby the attached end portions of the same are inserted in the mold cavity or cavities so as to be enveloped by the composition and imbedded therein during the molding process.

After the metallic lead or connection is associated with the mold, and the brush or contact composition introduced into the latter, pressure is applied to the mass to compact or compress the same to desired shape and dimensions and heat is applied to harden the composition, thus consolidating the latter in its finished form. A hydraulic press is usually employed as the medium for applying pressure, and any suitable means may be employed to heat the mold to proper temperature for hardening the binder of the composition, or heat sufficient to harden the binder to render the same infusible and insoluble may be applied subsequent to the molding operation. By the application of the pressure and heat to the brush or contact composition, not only is the same densely compacted or consolidated in finished form and dimensions, but the mass of the same is caused to be strongly compressed around the imbedded end portion of the metallic lead or connection so as to engage with the same in strong and durable mechanical union, but in such manner as to also produce a close mutual electrical contact of the brush or body member with the imbedded attached end portion of the current carrying metallic lead or connection; all as illustrated in Figure 1.

It will be understood that the current carrying metallic lead or connection may take other forms than the described flexible wire, since rigid wires or metallic connections of various forms may be employed. For example, I have shown in Figure 2 a rigid metallic current carrying connection or block $5^a$ imbedded in the composite brush or contact body 4, by molding the latter about the former and consolidating the mass of the latter in such relation by pressure and heat as above mentioned. To such form of current carrying connection may be attached, if desired, outgoing leads or conductors $5^b$, mechanically secured thereto in any desired manner.

When the brush or contact body 4 is to be used under conditions involving wearing down thereof, as, for example when used as a commutator brush, it is desirable that the attached end of the metallic lead or connection occupy, within the mass of the brush or contact body 4, as little linear space in the direction of wear as possible, and yet provide a sufficient length of attached end portion of the lead or connection as will assure a substantial area of electrical contact between the same and the brush or contact body. In such case, the imbedded or attached end portion of the metallic lead or connection may be bent laterally or doubled on itself, as shown at 7 more especially in Figures 3 to 5 inclusive of the drawings.

When a composite brush or contact body with the molded in current carrying lead or connection is to be employed under conditions of use likely to subject the same to more or less vibration or movement, I have found that both a more durable mechanical connection as well as a more efficient and intimate electrical contact of one member with the other may be attained by providing the imbedded attached end portion of the metallic lead or connection with a coating of relatively soft metal, such, e. g., as tin and lead solder, or other suitable solder alloy, cadmium or similar comparatively soft metal. The coating 8 of soft metal is thus interposed between the relatively hard metallic lead or connection 5 and the composite brush or contact body 4, so that when the composition of the latter is compressed and hardened said coating 8 will be squeezed into very close conformity to the physical structure of both members, thereby producing an exceedingly close and intimate contact or union with the lead or connection on the one side and the brush or contact body on the other side. Furthermore, under the binder hardening heat applied to the brush or contact composition, a temperature is reached which tends to further soften or fuse the soft metal coating 8, although not effective to injure or soften the relatively hard metal of the lead or connection, and consequently not only tends to assure the above mentioned mechanical conformity, but also permits the softened metal coating to exercise its adhering affinity respectively with the conductive material of the brush or contact body on the one hand and the metallic lead or connection on the other hand, all of which is conducive to better or more efficient electrical contact on both sides, tending to reduce electrical resistance and consequently voltage drop between the brush or contact body and the metallic lead or connection.

While the composite brush or contact bodies with the imbedded leads or connections may be individually formed or molded, for large and rapid production it is preferable to mold the brush or contact composition into plate form as indicated by the reference character 4ª in Figure 5, the same being provided with a multiple or plurality of metallic current carrying leads or connections suitably spaced apart in association with the opposite long sides of said plate. After the molding and hardening operations, this plate may be cut up into a plurality of single brush or contact units of desired size, each provided with the molded in current carrying lead or connection according to this invention.

Having thus described my invention, I claim:—

1. As a new article of manufacture, a composite electrical contact body composed of intermixed electrically conductive material and a binder consolidated by pressure and heat, a metallic current carrying connection for said body, a coating of relatively soft solid metal on the attached portion of said connection, said coated attached portion being imbedded in said body with the mass of the latter compressed and hardened about the same.

2. As a new article of manufacture, a composite electrical contact body composed of electrically conductive material and a binder material capable of becoming insoluble and infusible when subjected to heat, said materials being consolidated by pressure and heat, and a metallic current carrying connection for said body, a coating of relatively soft solid metal on the attached portion of said connection, said coated attached portion being imbedded in said body with the mass of the latter compressed and hardened about the same.

3. As a new article of manufacture, a composite electrical contact body composed of electrically conductive material and a binder material capable of becoming insoluble and infusible when subjected to heat, said materials being consolidated by pressure and heat, and a flexible copper wire lead for said body, a coating of relatively soft solid metal on the attached portion of said lead, said coated attached portion being imbedded in said body with the mass of the latter compressed and hardened about the same.

In testimony, that I claim the invention set forth above I have hereunto set my hand this 17th day of February, 1926.

W. BURKE BRADY.